(12) United States Patent
Baldridge et al.

(10) Patent No.: US 6,699,391 B2
(45) Date of Patent: Mar. 2, 2004

(54) BIOFILM REDUCTION IN CROSSFLOW FILTRATION SYSTEMS

(75) Inventors: John W. Baldridge, Newport Beach, CA (US); Andrew Michalow, Mission Viejo, CA (US)

(73) Assignee: Advanced BioCatalytics Corporation, Irvine, CA (US)

(*) Notice: Subject to any disclaimer, the term of this patent is extended or adjusted under 35 U.S.C. 154(b) by 0 days.

(21) Appl. No.: 09/948,457

(22) Filed: Sep. 7, 2001

(65) Prior Publication Data

US 2003/0047510 A1 Mar. 13, 2003

(51) Int. Cl.[7] .................................................. C02F 1/00
(52) U.S. Cl. ....................................................... 210/632
(58) Field of Search ......................................... 210/632

(56) References Cited

U.S. PATENT DOCUMENTS

| | | | | |
|---|---|---|---|---|
| 4,978,424 A | * | 12/1990 | Matsuda et al. | ............ 216/101 |
| 5,411,666 A | | 5/1995 | Hollis et al. | |
| 5,593,670 A | | 1/1997 | Trinh et al. | |
| 5,670,055 A | * | 9/1997 | Yu et al. | ..................... 210/698 |
| 5,783,544 A | | 7/1998 | Trinh et al. | |
| 5,789,239 A | * | 8/1998 | Eyers et al. | ................. 435/264 |
| 5,820,758 A | | 10/1998 | Dale et al. | |
| 5,849,566 A | | 12/1998 | Dale et al. | |
| 5,879,928 A | | 3/1999 | Dale et al. | |
| 5,885,950 A | | 3/1999 | Dale et al. | |
| 5,942,480 A | * | 8/1999 | Prevost et al. | ............... 510/161 |
| 6,210,575 B1 | * | 4/2001 | Chase et al. | ................. 210/304 |
| 6,358,914 B1 | * | 3/2002 | Gabriel et al. | .............. 510/528 |
| 2003/0022280 A1 | * | 1/2003 | Takagi et al. | .............. 435/69.1 |

FOREIGN PATENT DOCUMENTS

JP      11256081 A   *   9/1999   ........... C09D/11/00

OTHER PUBLICATIONS

Whittaker, H., et al, "Evaluation of Cleaning Strategies for Removal of Biofilms From Revers–Osmosis Membranes," Applied and Environmental Microbiology, Aug. 1994, pp. 395–403.

* cited by examiner

*Primary Examiner*—Chester T. Barry
(74) *Attorney, Agent, or Firm*—Orrick, Herrington & Sutcliffe, LLP

(57) ABSTRACT

Systems and methods for reducing biofilms are described. The systems and methods are particularly suitable for use with conventional aqueous crossflow filtration systems, such as reverse osmosis systems. The addition of the enzyme/surfactant compound has been found to enhance the effectiveness of conventional crossflow filtration processes by decreasing or inhibiting the growth of biofilms and other contaminants.

17 Claims, 1 Drawing Sheet

BIOFILM REDUCTION IN CROSSFLOW FILTRATION SYSTEMS

FIELD OF THE INVENTION

The present invention relates to systems and methods for reduction and control of bacterial biofilm. More particularly, the present invention relates to systems and methods for reduction of biofilms in crossflow filtration systems.

BACKGROUND OF THE INVENTION

Biofilms are formed when colonies of bacteria aggregate on surfaces in many different locations. When bacteria in biofilm aggregate, they produce a sugary, polysaccharide-containing mucous coating, or slime. Bacteria grow and multiply faster when attached (sessile) than when free-floating (planktonic). Within the slime, the bacteria form complex communities with intricate architecture including columns, water channels, and mushroomlike towers. These structural details are believed to improve biofilm nutrient uptake and waste elimination, as blood vessels do in an animal's body. More information about biofilms is provided in an article entitled "Sticky Situations: Scientists are Beginning to Understand How Bacteria Find Strength in Numbers" by Jessa Netting, published in Science News, 60:28–30, Jul. 14, 2001, which is the basis for the information in this and the following paragraphs, and which is hereby incorporated by reference herein in its entirety.

Biofilms occur in a wide range of locations. Many are found on or in the human body, including on the teeth, gums, ears, prostate, lungs, and heart, where they are believed to be implicated in chronic infections such as gum disease, ear infections, infections of the prostate gland and heart, and lung infections in people with cystic fibrosis. Biofilms also occur in nature, such as the slime that covers river rocks, marshes, and the like. Biofilms also occur in medical equipment, such as catheters, and are a major source of hospital infections. Biofilms can also occur in areas such as contact lenses, other medical equipment, and in other industries. A primary difficulty with biofilms is that they are more difficult to reduce or eliminate than are individual bacteria. This is due to the formation of the protective layer of slime, as well as adaptations that the individual bacteria undergo when they form biofilms.

One important area in which biofilms occur is in aqueous systems that use separation membranes, such as particle filtration, microfiltration, ultrafiltration, nanofiltration, and particularly reverse osmosis ("RO") systems. Microfiltration membranes are typically polymer or metal membrane disc or pleated cartridge filters rated in the 0.1 to 2 micron range that operate in the 1 to 25 psig pressure range. Ultrafiltration is a crossflow process that rejects contaminants (including organics, bacteria, and pyrogens) in the 10 angstrom to 0.1 micron range using operating pressure in the 10 to 100 psig range. Nanofiltration equipment removes organic compounds in the 200 to 1,000 molecular weight range, rejecting selected salts. Reverse osmosis removes virtually all organic compounds and 90 to 99% of all ions under pressure in the 200 to 1000 psig range.

These systems use membranes to selectively remove or separate extremely small substances from water and process streams in residential, commercial, and industrial applications. When biofilm is present on the membrane due to microbial growth, colloidal solids and insoluble precipitates can adhere to the sticky substance. As this combination builds, water transmission rates through the membrane are reduced and/or additional pressure must be applied to maintain the same water transmission rates. Colloidal solids, microbiological growth, and insoluble precipitates can collect on the membrane during operation. Conventional treatment methods include continuous dosing, in which a residual level of a biocidal agent is maintained within the system, or periodic cleaning and sanitization, in which the filtration system is shut down for a periodic cleaning and sanitization using biocidal agents, acids and caustics. Even with continuous dosing methods, at some point the filtration system must be shut down so that the membrane can be cleaned or replaced. This results in downtime and consequent additional operating expense. Moreover, the cleaning and biocidal agents and caustics that are conventionally used to clean and sanitize the filtration systems have the effect of degrading the filter membranes, which are typically comprised of polymers such as cellulose acetate or polyamide polymers. A number of pre-treatment processes are also available to reduce the fouling potential of the feed water being introduced to the membrane. These include various types of filtration, disinfection, and chemical treatment. Even with these methods, however, most RO treatment systems must be cleaned regularly.

Accordingly, there exists a long-felt need for improved treatment processes that can achieve reductions in biofilm, particularly in the area of aqueous systems that use separation membranes.

SUMMARY OF THE INVENTION

The present systems and methods are directed to the use of compositions including enzymes and surfactants to obtain biofilm reduction. The enzyme/surfactant compound comprises a blend of enzymes and surfactants over a broad range of compositions and concentrations dependent upon the biofilm treatment application. Additional optional components may include micronutrients that are generated during the enzyme production process or added as additional ingredients. Further optional ingredients in the enzyme/surfactant compound include enzyme stabilizers and anti-microbials to prevent product degradation.

The addition of the enzyme/surfactant compound has been found to enhance the effectiveness of crossflow filtration systems, particularly reverse osmosis systems, by increasing throughput, maintaining or improving efficiency, reducing biofilm, decreasing periodic maintenance requirements, and decreasing the need for costly system shutdowns.

It is thus an object of this invention to provide systems and methods for reducing biofilms.

It is a further object of this invention to provide systems and methods for improving the performance of aqueous systems that use separation membranes, thus enhancing the separation process of such systems.

It is a still further object of this invention to provide systems and methods for reducing biofilm and other fouling agents in crossflow filtration systems, thus enhancing the filtration process.

It is a still further object of this invention to provide improved aqueous filtration systems and methods that reduce fouling.

These and further objects and advantages will become apparent upon consideration of the detailed description and drawings enclosed herein.

DETAILED DESCRIPTION OF THE PREFERRED EMBODIMENTS

The materials, systems, and methods of the present invention involve the use of an enzyme/surfactant blend compound to reduce biofilms where they occur. The description below will focus on crossflow filtration systems, particularly reverse osmosis systems. It should be understood, however, that the materials, systems, and methods described herein have a broad range of applications, and are not limited solely to filtration systems, crossflow filtration systems, or reverse osmosis filtration systems.

Figure 1:
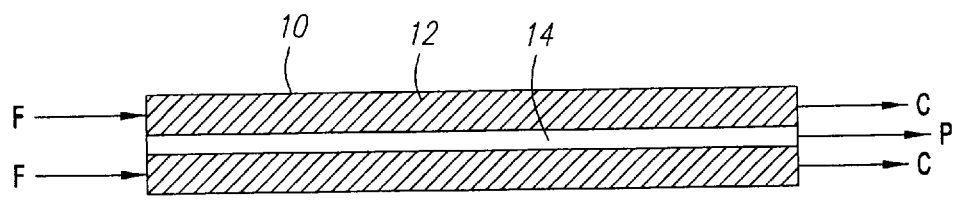
FIG. 1 is a flow diagram illustrating a conventional reverse osmosis filtration system.

FIG. 1 is a flow diagram illustrating a conventional reverse osmosis filtration system. Feed water (F) enters a first end of the vessel 10, and concentrate (C) exits from the opposite end of the vessel. A membrane system 12 will typically comprise a plurality of spiral-wound membranes tightly wound within the vessel. A permeate tube 14 is provided at the center of the vessel, surrounded by the membrane system 12. As the feed water (F) enters the vessel 10, it encounters the membrane system 12. The permeate (P) passes through the membranes into the permeate tube 14, where it eventually exits the vessel as indicated in FIG. 1.

Figure 2:
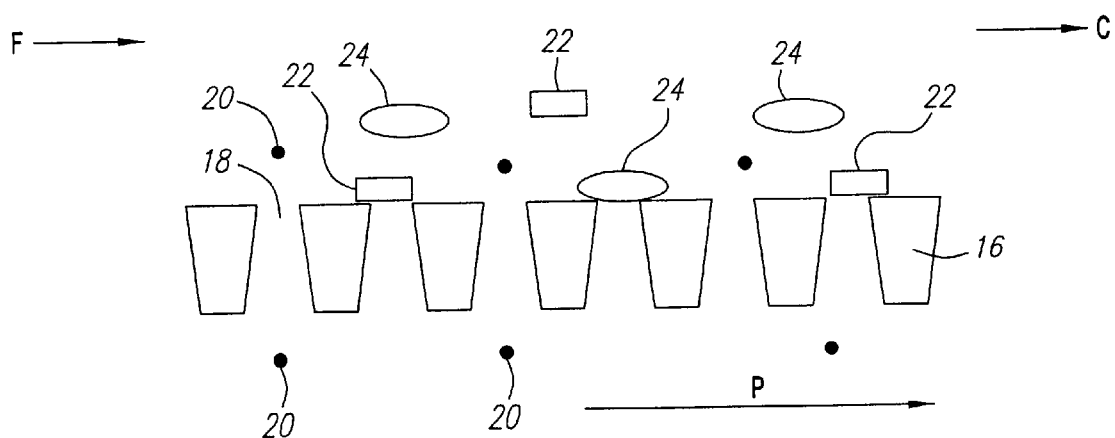
FIG. 2 is a graphical illustration of a membrane showing its function of filtering an aqueous stream containing contaminants.

FIG. 2 is a graphical illustration of a membrane showing its function of filtering an aqueous stream. The membrane includes a solid barrier 16, usually formed of cellulose acetate, metal, or a polymer such as a polyamide. Sub-microscopic pores 18 are sized to pass water 20 while rejecting oil, dirt, and other contaminants 22. The pores also reject bacteria 24. A properly designed membrane and system allows only desired molecules to pass through the membrane barrier regardless of the feed stream contaminant level.

Figure 3:
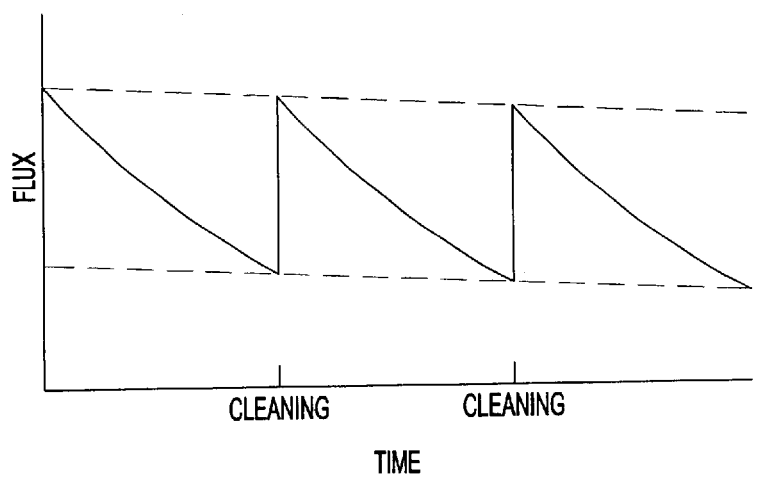
FIG. 3 is a graph showing flux vs. time for an aqueous crossflow filtration system.

As biofilm or other contaminants build up on a membrane system, the system performance will deteriorate. For example, the filtration system may require an increased pressure differential to produce the same flux as the system in its "clean" state. Stated otherwise, for the same level of pressure differential, the flux rate of the system will decrease. For these purposes, the term "pressure differential" or "Delta Pressure" refers to the difference in pressure between the feed stream (F) and the permeate stream (P), and "flux" refers to the flow rate of the permeate stream (P). This deterioration of performance is illustrated graphically in FIG. 3. For each cycle between periodic cleanings, the flux will gradually deteriorate over time as biofilm and other contaminants build up on the membrane system. The periodic cleaning will cause the flux level to increase, although typically not to its peak level from the previous cycle because the membrane will generally degrade due to use and, in most circumstances, due to the cleaning process. Thus, in addition to the fluctuations of the system flux between periodic cleanings, there will also be an observed general decline in system performance over time, as illustrated in the parallel downward sloping phantom lines in FIG. 3.

It has been found that the addition of an enzyme/surfactant compound to the feed stream (F) has the effect of decreasing fouling of the filter system, and enhancing the filtration and concentration processes of conventional filtration systems. The enzyme/surfactant compound is a blend of enzymes and surfactants of a range of compositions and concentrations. The basic enzyme/surfactant composition may be supplemented with micronutrients generated during the enzyme production process or added separately. It is also possible to supplement the enzyme/surfactant compound with stabilizers, compounds that give significant stability to the activity of the enzymes. The composition may also optionally be supplemented with anti-microbial agents that inhibit the growth of microbes in its concentrated form.

Enzymes degrade pollutants of biological origin, such as fats, oils, proteins and polysaccharides. Other enzymes are known to degrade hydrocarbons. Enzymes pre-digest pollutants so they may be more easily taken up and degraded by bacteria. In its preferred form, the enzyme/surfactant compound may contain one purified enzyme or a broad spectrum of enzymes and enzymatic activities. Typical enzymes included in the compound include lipases and esterases, phosphatases, proteases, glycosidases, cellulases, cellobiases, and polysaccharide hydrolases. Enzymes in the compound may also include enzymes with other specificities such as oxidative enzymes, and the composition of an enzyme cocktail used in the compound may be specifically formulated to meet the needs of specific aqueous filtration applications. A nonlimiting list of enzymes and enzyme activities believed to be useful in the enzyme/surfactant compound includes the following: alkaline phosphatase, esterase (C-4), esterase-lipase (C-8), lipase (C-14), leucine arylamidase, valine arylamidase, cystine arylamidase, trypsin, chymotrypsin, acid phosphatase, naphthol-AS-BI-phosphohydrolase, alpha galactosidase, beta galactosidase, beta glucuronidase, alpha glucosidase, N-acetyl-beta-glucosaminidase, alpha mannosidase, and alpha fucosidase.

There are a great many materials derived from plant, animal, and microbial sources that have been known to those skilled in the art to be rich sources of enzymes. These source materials may be used with full, partial, or no purification of enzymes to obtain enzymes for use in the enzyme/surfactant compound. Some of these sources of enzymes are provided in Table 1 below. Additional information concerning the sources of enzymes useful in the enzyme/surfactant compound may be found in: Thomas E. Barman, *Enzyme Handbook*, Vols. I–II (Springer-Verlag, New York 1969); Dixon and Webb, *Enzymes*, pp. 671–785 (Academic Press Inc., 1964); Kornberg, *For the Love of Enzymes: The Odyssey of a Biochemist*, p. 37 (Harvard University Press, 1989); Fruton and Simmonds, *General Biochemistry*, pp. 218–219 (John Wiley and Sons, 2nd Ed. 1958); U.S. Pat. No. 4,891,320 to Aust et al.; and U.S. Pat. No. 3,635,797 to Battistoni et al. Each of these publications is hereby incorporated by reference herein in its entirety.

TABLE 1

| SOURCE MATERIAL | ENZYMES | REFERENCE |
| --- | --- | --- |
| Yeast Extract | Invertase (Sucrase) | Kornberg |
| | Catalase | Fruton and Simmonds |
| | Lactase | Battistoni et al. |
| | Maltase | |
| | Carboxylase | |
| | Oxidative and Metabolic enzymes | |
| Malt Extract | Amylase | Kornberg |
| | Maltase | Battistoni et al. |
| | Diastase | |
| Hen's Egg White | Lysozyme | Fruton and Simmonds |
| Animal Pancreas | Chymotrypsin | Fruton and Simmonds |
| | Trypsin | |
| Plant Juices and | Papain | Fruton and Simmonds |

TABLE 1-continued

| SOURCE MATERIAL | ENZYMES | REFERENCE |
|---|---|---|
| Resins | Peroxidases | |
| Bacteria | Glycoside Hydrolases<br>Proteases and Peptidases<br>Lipases | Dixon and Webb |
| Fungi | Peroxidases | Aust et al. |

The extraction of enzymes from source materials may be enhanced by enzymatic activity. It is a well established practice to effect the release of enzymes from yeast cells by autolysis, that is the use of endogenous (yeast produced) enzymes to break yeast cell membranes. The release of enzymes may also be enhanced by the use of exogenous enzymes. For example, the addition of cellulases to malt increases the yield of other hydrolytic enzymes derived from this source material. Beyond this, methods of obtaining or manufacturing enzymes or enzyme cocktails from these source materials are well-known in the art and are beyond the scope of this discussion, and will therefore not be repeated here. All of the enzymes, endogenous, exogenous, and those released from source materials may be incorporated into the composition so that it has as broad a range of enzymatic activities as possible.

In a preferred form, the enzyme/surfactant compound includes enzyme activities from Esterases, such as esterase (C-4) and esterase-lipase (C-8); Proteases, such as cystine arylamidase and chymotrypsin; Glycosidases, such as beta galactosidase, beta glucoronidase, beta glucosidase, and alpha mannosidase; and Phosphatases, such as acid phosphatase and naphthol-AS-BI-phosphohydrolase. It is believed that other and further enzymes may further enhance the effectiveness of the enzyme/surfactant compound. Accordingly, this list should be considered illustrative and not limiting.

Enzymes may be prepared by a number of methods known to those skilled in the art, including various fermentation processes. Enzymes for use in the enzyme/surfactant compound may be prepared as an enzyme cocktail derived from the fermentation product of molasses and diastatic malt by *Saccharomyces cerevisiae*. Additional yeast strains that may be used instead of or in addition to *Saccharomyces cerevisiae* include *Kluyveromyces marxianus, Kluyveromyces lactis, Candida utilis* (Torula yeast), Zygosaccharomyces, Pichia, Hansanula, and others known to those of skill in the art. Micronutrients may be added to the process, including diammonium phosphate, ammonium sulfate, magnesium sulfate, zinc sulfate and calcium chloride. Additional micronutrients, such as vitamins and amino acids, are produced during the fermentation.

Surfactants that are useful in the enzyme/surfactant compound may be either nonionic, anionic, amphoteric or cationic, or a combination of any of the above, depending on the aqueous filtration application. Suitable nonionic surfactants include alkanolamides, amine oxides, block polymers, ethoxylated primary and secondary alcohols, ethoxylated alkylphenols, ethoxylated fatty esters, sorbitan derivatives, glycerol esters, propoxylated and ethoxylated fatty acids, alcohols, and alkyl phenols, glycol esters, polymeric polysaccharides, sulfates and sulfonates of ethoxylated alkylphenols, and polymeric surfactants. Suitable anionic surfactants include ethoxylated amines and/or amides, sulfosuccinates and derivatives, sulfates of ethoxylated alcohols, sulfates of alcohols, sulfonates and sulfonic acid derivatives, phosphate esters, and polymeric surfactants. Suitable amphoteric surfactants include betaine derivatives. Suitable cationic surfactants include amine surfactants. Those skilled in the art will recognize that other and further surfactants are potentially useful in the enzyme/surfactant compound depending on the particular aqueous filtration application.

Preferred anionic surfactants used in the enzyme/surfactant compound include CalFoam ES 603, a sodium alcohol ether sulfate surfactant manufactured by Pilot Chemicals Co., and Steol CS 460, a sodium salt of an alkyl ether sulfate manufactured by Stepan Company. Preferred nonionic surfactants used in the enzyme/surfactant compound include Neodol7 25-7 or Neodol7 25-9, which are $C_{12}$–$C_{15}$ linear primary alcohol ethoxylates manufactured by Shell Chemical Co., and Genapol7 26 L-60, which is a $C_{12}$–$C_{16}$ natural linear alcohol ethoxylated to 60E C cloud point (approx. 7.3 mol), manufactured by Hoechst Celanese Corp. It should be understood that these surfactants and the surfactant classes described above are identified only as preferred materials and that this list is neither exclusive nor limiting of the enzyme/surfactant compound.

One or more additional components may optionally be added to the enzyme/surfactant compound in order to stabilize the compound and increase shelf life. Such additional components may include enzyme stabilizers, anti-microbial agents, and antioxidants.

Enzyme stabilizers are effective to extend the enzymatic activity of enzymes. Enzyme stabilizers can include sugars, polyhydrilic alcohols, other organic solvents, ionic or nonionic species, and polymers. An example of a commonly used stabilizer is propylene glycol.

Examples of anti-microbial agents that may be used in the enzyme/surfactant compound include propylene glycol, methyl paraben, propyl paraben, and sodium benzoate.

Examples of antioxidants that may be incorporated into the enzyme/surfactant compound include butylated hydroxyanisole (BHA), butylated hydroxytoluene (BHT), ascorbic acid, and others.

It is preferable to adjust the pH of the enzyme/surfactant compound to from about 3.75 to about 5.0, and most preferably to from about 4.2 to about 4.5, with phosphoric acid to help stabilize the product. In particular, it is beneficial to make the compound acidic in order to optimize the activity of the anti-microbial agents, such as methyl or propyl paraben.

A preferred composition of an enzyme/surfactant compound useful in the systems and methods described herein is provided in Table 2 below.

TABLE 2

| Component Type | Component | Concentration Range (% by weight) | Preferred Concentration (% by weight) |
|---|---|---|---|
| Solvent | Water | 25.0–90.0 | 63.92 |
| Enzyme/Nutrient Source | Enzyme Cocktail (Fermentation product of molasses and diastatic malt by *Saccharomyces cerevisiae*) | 5.0–60.0 | 20.0 |
| Micronutrients | Inorganic salts (e.g., diammonium phosphate, ammonium sulfate, magnesium sulfate, zinc sulfate, calcium chloride) | 0.05–2.50 | 0.31 |

TABLE 2-continued

| Component Type | Component | Concentration Range (% by weight) | Preferred Concentration (% by weight) |
|---|---|---|---|
| Surfactant (Non-ionic) | Neodol7 25-7 | 2.0–40.0 | 7.5 |
| Surfactant (Anionic) | Steol CS 460 | 0.5–20.0 | 2.5 |
| Stabilizer | Propylene glycol | 0.5–40.0 | 5.27 |
| Anti-microbial agent | Methyl paraben | 0.03–0.5 | 0.15 |
| Anti-microbial agent | Propyl paraben | 0.01–0.3 | 0.05 |
| Anti-microbial agent | Sodium benzoate | 0.03–0.5 | 0.15 |
| Antioxidant | BHA | 0.002–0.1 | 0.02 |
| Antioxidant | BHT | 0.002–0.1 | 0.02 |
| Antioxidant | Ascorbic acid | 0.05–2.0 | 0.11 |
| | | TOTAL: | 100.00 |

To achieve reduction of biofilm and other contaminants in a reverse osmosis or other aqueous crossflow filtration system, an enzyme/surfactant compound, such as one having the composition listed in Table 2 above, is preferably added to a feed stream at a concentration of about 0.1 parts per million (ppm) to about 25 ppm, depending on the particular application and the contaminants of interest. Higher or lower concentrations may also be possible. A preferred concentration for tertiary treatment of municipal wastewater is from about 0.5 ppm to about 5 ppm, particularly about 3 ppm. A cleaning cycle may be employed wherein the concentration is increased for a period of time. A preferred cleaning cycle includes a concentration of the enzyme/surfactant compound of about 6 to about 25 ppm for a period of from about 3 to about 12 hours. A particularly preferred cycle comprises a concentration of about 9 ppm for a period of about 6 hours.

Experiments have shown that the use of the enzyme/surfactant compound increases system performance by preventing fouling due to biofilm and other contaminants. This result has been observed in two ways. Referring once again to FIG. 3, first, the flux rate between system cleaning cycles has been observed to decrease less through use of the enzyme/surfactant compound. Second, the overall system performance has been observed to degrade significantly less when the enzyme/surfactant compound has been used. It is believed that the increased system performance may be due, at least in part, to a breakdown of the sticky polysaccharide biofilm material.

For example, studies were conducted to determine the effects of treating sludge with the composition listed as the "Preferred Concentration" in Table 2. Sludge mass is made up of clumps of bacteria, held together by the sticky polysaccharide biofilm material. During the filtration process, this creates a barrier film that does not allow the water to freely drain from the sludge mass. Sludge was obtained from the Orange County (California, United States) Sanitation District for the study. Testing was conducted to determine TSS (Total Suspended Solids), COD (Chemical Oxygen Demand), and Filtration Characteristics, or water retention. Baseline data, as well as treated and control were recorded, with the following results:

| | TSS (%) | COD (ppm) | Sludge Volume Reduction (%) |
|---|---|---|---|
| Baseline | 3.82% | 390 ppm | N.A. |
| Control | 3.59% | 2115 ppm | 20.33% |
| Treated | 3.59% | 2590 ppm | 14.53% |
| % Change Over Control | 0.00% | +18.3% | −28.5% |

While the TSS levels were reduced by 7% for both the Treated and Control from the Baseline, the permeate from the Treated sample exhibited an increase in COD of 18.3% over the Control. It is assumed that the reduction in TSS occurred due to a decay of the actual cells or walls. However, the COD results, in conjunction with the significant reduction of sludge volume for the Treated sample vis-à-vis the Control, establish that channeling in the sludge matrix is improved, allowing the water to drain through (or around) the bacterial cell matter. This is due to the breakdown of the sticky polysaccharide biofilm material.

The foregoing descriptions include a detailed description of the use of an enzyme/surfactant compound for the treatment of wastewater or drinking water in crossflow filtration systems. One example of such systems is water desalination. It has been found that the enzyme/surfactant compound, when used in a water desalination process, improves the efficiency of the desalination process.

In the wastewater or drinking water systems and methods described herein, the filtrate is the "product" obtained from the permeate in the process. As yet another example, the methods described herein may also be used in applications where the concentrate is the "product." For example, in the dairy, fruit juice, or other industries, concentration processes are used to eliminate water from a feed stream. In those types of systems and methods, the enzyme/surfactant compound may be used as part of a cleaning cycle to effectively clean filter membranes without damaging them as would be the case with strong acid or caustic cleaning materials. In those systems and methods, the enzyme/surfactant compound is circulated/recirculated at a concentration of as low as 5–10 ppm to as high as 1% to 5%. The actual use levels would be highly dependent on the nature of the foulant, time limits for the cleaning cycle, temperatures of the cleaning solutions, filter membrane construction and/or materials, filter type (micro, ultra, nano, or reverse osmosis), and other factors. As a non-limiting example, the process of concentrating milk causes a significant buildup of not only biofilm on the filter membranes but also significant quantities of butter fat, oil, protein, and other milk constituents. In that example, a circulation of a cleaning solution of about 1% to 2% of the enzyme/surfactant compound is utilized at a temperature of 100° F. or higher for as little as 10 minutes. Treatments using the enzyme/surfactant compound result in reduced wear and tear on the filter membranes.

Yet another application of the enzyme/surfactant compound is in connection with filtration membranes used to eliminate the use of secondary clarifiers in wastewater treatment systems. In such systems, the enzyme/surfactant compound is introduced in, or prior to, the aeration basin. The filtration membranes are also placed in the aeration basin, but are placed in a quiescent zone within the basin. The benefits of using the enzyme/surfactant compound in these systems are: 1) to increase metabolic activity during the aerobic process, 2) to increase oxygen uptake, thus reducing aeration power requirements and costs, 3) to reduce biomass production, and 4) to reduce or eliminate biofouling of the filtration membranes.

Accordingly, the systems and methods described herein achieve improved reduction of biofilms and other benefits. While the above description has focused primarily on crossflow filtration systems, and particularly reverse osmosis systems, it is believed that the enzyme/surfactant compound is useful in reducing biofilms wherever they may occur.

Thus, the compounds, systems and methods of the present invention provide many benefits over the prior art. While the above description contains many specificities, these should not be construed as limitations on the scope of the invention, but rather as an exemplification of the preferred embodiments thereof. Many other variations are possible.

Accordingly, the scope of the present invention should be determined not by the embodiments illustrated above, but by the appended claims and their legal equivalents.

What is claimed is:

1. A method for reducing biofilm in an aqueous system, comprising the steps of:
    providing a mixture containing enzymes and surfactants, wherein said mixture comprises lipase, and
    introducing the mixture to an aqueous system containing biofilm.

2. The method of claim 1, wherein said mixture comprises at least one nonionic surfactant.

3. The method of claim 2, wherein said mixture comprises at least one nonionic ethoxylated primary alcohol.

4. The method of claim 1, wherein said aqueous system is a crossflow filtration system.

5. The method of claim 4, wherein said mixture comprises a fermentation product Saccharomyces cerevisiae.

6. The method of claim 5, wherein said mixture comprises at least one nonionic surfactant.

7. The method of claim 5, wherein said mixture further comprises a $C_{12}$–$C_{16}$ linear alcohol ethoxylate surfactant.

8. The method of claim 7, wherein said fermentation product is present in said mixture at a concentration of from about 5.0% by weight to about 60.0% by weight, and said mixture is added to the reverse osmosis system to obtain a concentration by weight of the mixture of from about 0.1 part per million to about 25 parts per million.

9. The method of claim 7, wherein said fermentation product is present in said mixture at a concentration of from about 5.0% by weight to about 60.0% by weight, and said mixture is added to the reverse osmosis system to obtain a concentration by weight of the mixture of from about 1 parts per million to about 5 parts per million.

10. A method for reducing biofilm in an aqueous system, comprising the steps of:
    providing a mixture containing enzymes and surfactants, wherein said mixture comprises a fermentation product of Saccharomyces cerevisiae, and
    introducing the mixture to an aqueous system containing biofilm.

11. The method of claim 10, wherein said mixture comprises at least one nonionic ethoxylated primary alcohol surfactant.

12. The method of claim 10, wherein said mixture comprises a $C_{12}$–$C_{16}$ linear alcohol ethoxylate surfactant.

13. The method of claim 12, wherein said fermentation product is present in said mixture at a concentration of from about 5.0% by weight to about 60.0% by weight, and said mixture is added to the aqueous system to obtain a concentration by weight of the mixture of from about 0.1 part per million to about 25 parts per million.

14. The method of claim 12, wherein said fermentation product is present in said mixture at a concentration of from about 5.0% by weight to about 50.0% by weight, and said mixture is added to the aqueous system to obtain a concentration by weight of the mixture of from about 1 parts per million to about 5 parts per million.

15. The method of claim 12, wherein said fermentation product is present in said mixture at a concentration of from about 5.0% by weight to about 60.0% by weight, and said mixture is added to the aqueous system to obtain a concentration by weight of the mixture of from about 1% to about 2%.

16. The method of claim 15 wherein the system temperature is 100° F. or higher.

17. The method of claim 16 comprising the additional step of removing the mixture containing enzymes and surfactants from the aqueous system within 10 minutes of said introducing step.

* * * * *